United States Patent Office 2,865,355
Patented Dec. 23, 1958

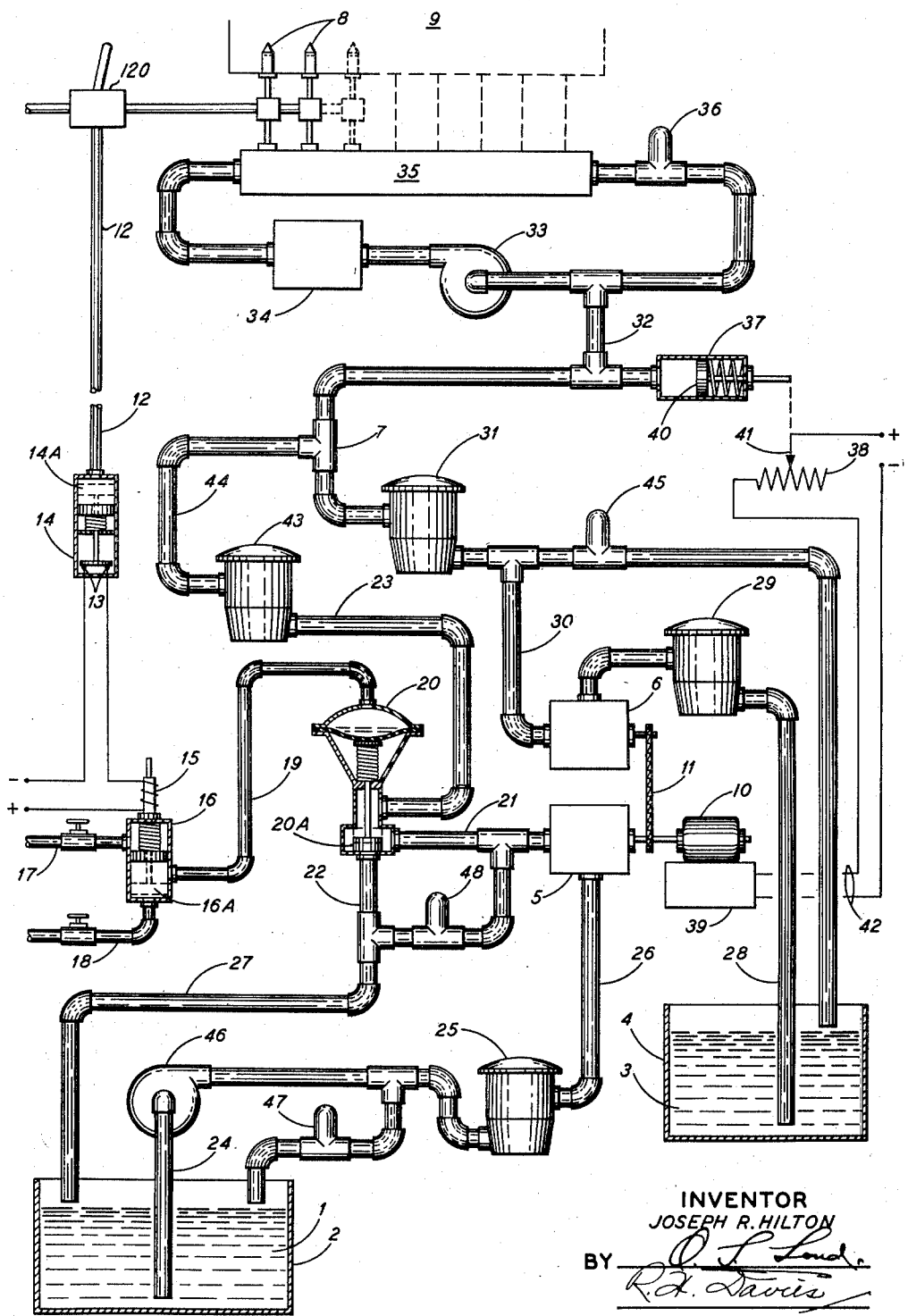

2,865,355

INTERNAL COMBUSTION ENGINE FUEL SYSTEM

Joseph R. Hilton, Concord, Calif., assignor, by mesne assignments, to California Research Corporation, San Francisco, Calif., a corporation of Delaware Application December 14, 1955, Serial No. 553,024

6 Claims. (Cl. 123—139)

This invention relates to internal combustion engine fuel systems, and particularly compression ignition engine fuel systems capable of supplying a plurality of dissimilar fuels to high and medium speed compression ignition engines; and an object of the invention is to provide a novel internal combustion engine fuel system capable of preparing and supplying to an internal combustion engine at varying rates a mixture containing constant predeterminable proportions of two dissimilar fuels.

The following will provide an indication of the scope intended herein for various terms: The term "dissimilar fuel" is intended to include, for example, fuels that are dissimilar in viscosity at a given temperature, or in miscibility, volatility, cetane number, or in any other characteristic by which the fuels may be distinguished. The term "residual fuel" or "heavy residual fuel" is intended to include particularly those hydrocarbon fuel oils predominantly comprising hydrocarbons boiling above 600° F., which will generally have a viscosity in Saybolt Seconds Universal (S. S. U.) lying in the range 100–10,000 S. S. U. at 100° F. The term "distillate fuel" is intended to include, for example, particularly those hydrocarbon fuel oils predominantly comprising hydrocarbons boiling below 600° F., which will generally have a viscosity below 1,000 S. S. U. at 100° F. The term "high and medium speed engines" is intended to include generally those compression ignition engines having speeds above 500 R. P. M., for example, the usual railroad diesel engines. As used herein, the term "low speed engines" is intended to include generally those compression ignition engines having speeds below 500 R. P. M., for example, large stationary engines and the usual marine diesel engines.

This invention is applicable to internal combustion engines generally, and to compression ignition engines operating at all speed ranges, although as the following discussion will show it is particularly useful in connection with high and medium speed compression ignition engines.

Because high and medium speed compression ignition engines generally have smaller bore diameters than the low speed compression ignition engines, it is easier for part of the fuel stream being injected into a cylinder of a high or medium speed engine to traverse the combustion chamber before it is vaporized, especially if the burning of heavier fuels is attempted, and if complete vaporization does not take place the unvaporized portions cause engine gumming. Also, especially on light loads or at idle, there is more tendency in the high and medium speed engines for the fuel, especially heavier fuels, to fail to vaporize completely, because of the short time the engines allow for vaporization and combustion. As a consequence of the reduced combustion chamber temperature because of the light engine load, and because of the further reduction in temperature due to incomplete vaporization and combustion, there is an increased tendency for the combustion to become quenched. Again, the unvaporized fuel portions cause engine gumming. In view of the foregoing it is particularly desirable and necessary, if the burning of residual fuels in a high or medium speed compression ignition engine is to be attempted, to first start the engine on the lighter distillate fuel, and to introduce the heavier fuel into the engine later when increased combustion chamber temperatures are more favorable for satisfactory burning of the heavier fuel. The present invention may be used in this manner, and such use is the preferred one for the foregoing reasons. The optimum engine speed and load conditions when introduction of the heavier fuels into an engine can be initiated most satisfactorily will vary from engine to engine. Notwithstanding the foregoing, however, should it be desirable or possible to start a given compression ignition engine on fuel mixtures containing any desired proportions of residual fuel, the apparatus of the present invention can be adjusted to so allow, and to maintain said desired proportion at higher load and speed conditions.

It has been suggested that the distillate fuel supply should be shut off when the operating conditions of a compression ignition engine are such that introduction of the heavier residual fuels can be initiated. However, such a course means that, because of the high viscosity of the residual fuel, with other factors being equal, the combustion chamber temperatures necessary to burn the residual fuel alone must be appreciably higher than those required to burn a mixture of residual and distillate fuel. Furthermore, to reduce the residual fuel viscosity by heating prior to injection to avoid incomplete vaporization in the combustion chamber is likely to subject sensitive parts of injectors and pump valves to prohibitive uneven thermal expansion. Therefore, it is desirable to reduce the residual fuel viscosity by combining distillate fuel with residual fuel. In this manner less residual fuel preheating is necessary, and the addition of relatively small proportions of distillate fuel to residual fuel will result in a mixture with a viscosity markedly lower than the initial viscosity of its residual fuel component. In view of the foregoing, it is an object of this invention to provide novel apparatus for operating high and medium speed compression ignition engines on both distillate and residual fuels, which is capable of supplying the engines with at least some distillate fuel at all engine speed and load conditions.

In accordance with the present invention, simple, effective and efficient methods and apparatus are provided for operating an internal combustion engine on a mixture of predeterminable fixed proportions of two dissimilar fuels by providing separate sources of said two dissimilar fuels, separate means for pumping said fuels in two separate streams, means coupling said pumping means to provide a fixed speed ratio therebetween, means for supplying a first of said streams to a mixing zone at all speeds and loads of said engine, means for supplying the second of said streams to said mixing zone at predeterminable speeds and loads of said engine, means for diverting said second stream from said mixing zone at lower engine speeds and loads, and means for withdrawing from said mixing zone the fuel therein and supplying it to said engine.

The novel features of the present invention are set forth with particularity in the appended claims. The invention will be better understood, however, both as to organization and operation, and additional objects and advantages thereof will be apparent, from the following description of a specific embodiment, when read in conjunction with the accompanying drawing in which the single figure is a schematic diagram of the apparatus of the invention as incorporated in a dual fuel system on a compression ignition internal combustion engine.

Referring now to the drawing, residual fuel 1 is pumped from residual fuel tank 2 and distillate fuel 3 is pumped from distillate fuel tank 4 by fuel transfer pumps 5 and 6, respectively, to mixing T 7 and thence as a fuel mixture to fuel injectors 8 of engine 9. Motor 10 supplies the driving force for pumps 5 and 6 which are coupled by chain drive 11. Chain drive 11 and its associated sprockets on the shafts of pumps 5 and 6 are selected to maintain a predeterminable ratio between the operating speeds of pumps 5 and 6. Other means may be provided for maintaining a predeterminable speed ratio between pumps 5 and 6, for example, means comprising gears or belts, or a direct shaft coupling.

Air line 12 is interconnected with the throttle 120 of engine 9 in such a manner that at starting, idling and predetermined low operating speeds of engine 9 plunger 14A is in the position shown by dotted lines, the contacts 13 of pressure switch 14 are open, and solenoid coil 15 is thus de-energized. With coil 15 de-energized, spring-loaded plunger 16A of air valve 16 is in the position shown by dotted lines and air is prevented from travelling from air line 18 through air line 19 to exert pressure on spring-loaded plunger 20A of three-way air-operated valve 20. Without air pressure on plunger 20A from line 19, the spring loading of plunger 20A maintains it in the position shown by dotted lines. With plunger 20A in that position, residual fuel 1 flowing in line 21 may flow to line 22 but is prevented by plunger 20A from flowing to engine 9 through line 23. Under these conditions, motor 10 is started and drives pumps 5 and 6. Pump 5 pumps residual fuel 1 from residual fuel tank 2 through lines 24, filter 25, line 26, pump 5, line 21, line 22 and line 27 back to residual fuel tank 2. At the same time, distillate fuel pump 6 pumps distillate fuel from distillate fuel tank 4 through line 28, filter 29, pump 6, line 30, filter 31, mixing T 7, and line 32 into the closed loop circulating system comprising circulating pump 33, orifice mixer 34, fuel header 35 and relief valve 36. This closed loop circulating system is described in more detail in the copending application of Primo L. Pinotti, "Dual Fuel System for Compression Ignition Engines," Serial No. 516,071, filed June 17, 1955 which issued August 14, 1956 as Patent No. 2,758,579, and was assigned to the assignee of the present invention. From the stream of distillate fuel thus circulating through header 35, the fuel requirements of engine 9 are supplied through injectors 8. Pressure control 37, variable resistance controller 38 and motor control 39 are so selected and adjusted that a drop in pressure in line 32 will cause spring-loaded piston 40 in pressure cylinder 37 to move arm 41 of variable resistance controller 38 to vary the voltage on circuit 42 in such a way that motor control 39 changes the speed of motor 10 by an amount sufficient to restore the desired pressure in line 32.

With engine 9 thus operating on distillate fuel and with residual fuel pump 5 thus circulating residual fuel back to residual fuel tank 2, engine 9 is allowed to warm up to desired operating conditions. Air line 12 is so interlocked with the throttle 120 of engine 9 that advancement of said throttle to a predetermined position will allow air from line 12 to force plunger 14A to the position shown by solid lines, thereby causing contacts 13 to close, thus energizing coil 15. The energizing of solenoid coil 15 causes plunger 16A of air valve 16 to move to the position shown by solid lines and permit air to pass from line 18 to line 19 and into three-way air-operated valve 20. Air thus entering into three-way air-operated valve 20 exerts a pressure on plunger 20A of three-way air-operated valve 20 and causes it to move to the position shown by solid lines. In the position shown by solid lines, plunger 20A prevents residual fuel 1 from flowing from line 21 to line 22 and permits residual fuel 1 to flow from line 21 to line 23 through filter 43 to line 44 and thence into mixing T 7. At mixing T 7, residual fuel 1 joins distillate fuel 3 and both fuels then flow as a fuel mixture through line 32 into the closed loop circulating system comprising circulating pump 33, orifice mixer 34, header 35, and relief valve 36. Residual fuel 1 and distillate fuel 3 are thus mixed at and beyond mixing T 7 in a ratio governed by the relative capacities of pumps 5 and 6 and by the speed ratio between pumps 5 and 6 that is provided by chain drive 11 and its associated sprockets. As in the case when distillate fuel alone is circulating in the said closed loop circulating system, the fuel requirements of engine 9 are supplied from the circulating mixture in header 35 through injectors 8.

Relief valve 45 is provided and set at a desired value to protect various parts of the fuel system from overload when the pressure in line 30 rises to an unnecessarily high value. Booster pump 46 may be provided, if desired, to aid pump 5 in causing a flow of residual fuel 1 from residual fuel tank 2 through line 26. Relief valve 47 is provided and set at a desired value to protect booster pump 46. Relief valve 48 is provided and set at a desired value to protect pump 5 and air-operated valve 20.

If desired, means other than chain drive 11 may be used to maintain a fixed ratio between the operating speeds of pumps 5 and 6. For example, a gear box could be used to maintain any desired relative speed ratio.

It will be appreciated that the various air valves and air lines can be so arranged in conjunction with the throttle 120 of engine 9 that residual fuel 1 will be added to the flow of distillate fuel 3 to engine 9 at any desired speed and load conditions of engine 9, including starting and idling conditions. However, as previously pointed out, engine 9 is preferably started on distillate fuel 3 only. For some engines it may be desirable, after starting on distillate fuel 3 only, to cut in residual fuel 1 to engine 9 at low engine speeds, whereas for other engines, because of their inherent operating characteristics, it may be desirable to postpone the addition of residual fuel 1 to the flow of distillate fuel 3 until higher engine operating speeds have been attained.

From the foregoing, it may be seen that the present invention operates in a novel and effective manner to maintain a constant predeterminable proportion between the flow rates of two fluids flowing in two separate fluid streams. It may also be seen that the invention is especially useful in maintaining predetermined proportions in fuel mixtures being supplied to internal combustion engines by dual fuel systems.

Although only specific arrangements and modes of construction and operation of the present invention have been described and illustrated, numerous changes could be made in those arrangements and modes without departing from the spirit of the invention. All such changes that fall within the scope of the appended claims are intended to be embraced thereby.

I claim:

1. Apparatus for selectively maintaining predeterminable ratios between the fluid flow rates in two fluid streams of dissimilar liquid fuels for an internal combustion engine having a throttle directly controlling the flow of said streams to said engine, comprising first rotating means in the first of said streams for causing liquid flow in said first stream at a rate governed by the speed of rotation of said first rotating means, second rotating means in the second of said streams for causing liquid flow in said second stream at a rate governed by the speed of rotation of said second rotating means, coupling means between said first and second rotating means for maintaining a constant ratio between the speeds of rotation of said first and second rotating means, means for driving said rotating means and coupling means, and a valve responsive to said throttle for preventing flow of one of said fluids to said engine until said throttle has been moved to a predetermined position, further motion of said throttle acting to open said valve to admit a mixture of both of said fuels to said engine in proportions determined by said first and second rotating means and said coupling.

2. Apparatus for selectively maintaining predeterminable ratios between the fluid flow rates in two fluid streams of dissimilar liquid fuels for an internal combustion engine having a throttle directly controlling the flow of said streams to said engine, comprising first rotating means in the first of said streams for causing fluid flow in said first stream at a rate governed by the speed of rotation of said first rotating means, second rotating means in the second of said streams for causing fluid flow in said second stream at a rate governed by the speed of rotation of said second rotating means, a chain drive between said first and second rotating means for maintaining a constant ratio between the speeds of rotation of said first and second rotating means, means for driving said rotating means and chain drive, and a valve responsive to said throttle for preventing flow of one of said fluids to said engine until said throttle has been moved to a predetermined position, further motion of said throttle acting to open said valve to admit a mixture of both of said fuels to said engine in proportions determined by said first and second rotating means and said chain drive.

3. Apparatus for selectively maintaining predeterminable ratios between the flow rates in two fluid streams of dissimilar fuels for an internal combustion engine having a throttle comprising first rotating means in the first of said streams for causing fluid flow in said first stream at a rate governed by the speed of rotation of said first rotating means, second rotating means in the second of said streams for causing fluid flow in said second stream at a rate governed by the speed of rotation of said second rotating means, a coupling comprising gears between said first and second rotating means for maintaining a constant ratio between the speeds of rotation of said first and second rotating means, means for driving said rotating means and coupling, and a valve responsive to said throttle for preventing flow of one of said fluids to said engine until said throttle has been moved to a predetermined position, further motion of said throttle acting to open said valve to admit a mixture of both of said fuels to said engine in proportions determined by said first and second rotating means and said coupling.

4. Apparatus according to claim 1, in which one of said fuel streams is a residual fuel and said valve is positioned in said last-named stream.

5. Apparatus according to claim 2, in which one of said fuel streams is a residual fuel and said valve is positioned in said last-named stream.

6. Apparatus according to claim 3, in which one of said fuel streams is a residual fuel and said valve is positioned in said last-named stream.

References Cited in the file of this patent

UNITED STATES PATENTS

| | | |
|---|---|---|
| 1,714,284 | Stitzer et al. | May 21, 1929 |
| 1,961,350 | Grunsky | June 5, 1934 |
| 2,163,241 | Huber | June 20, 1939 |
| 2,564,306 | Isreeli | Aug. 14, 1951 |
| 2,579,215 | Te Nuyl | Dec. 18, 1951 |

FOREIGN PATENTS

| | | |
|---|---|---|
| 639,264 | Germany | Dec. 2, 1936 |
| 836,125 | Germany | Apr. 10, 1952 |
| 841,225 | Germany | June 13, 1952 |